April 9, 1957  A. W. GOODLIFFE ET AL  2,788,243
HOSE-REELS WITH MEANS FOR JETTISONING THE HOSE
AND SEALING THE HOSE CONNECTION
Filed Jan. 20, 1956  6 Sheets-Sheet 1

INVENTORS
ARTHUR W. GOODLIFFE
PETER S. MACGREGOR

By Watson, Cole, Grindle, & Watson ATTORNEYS

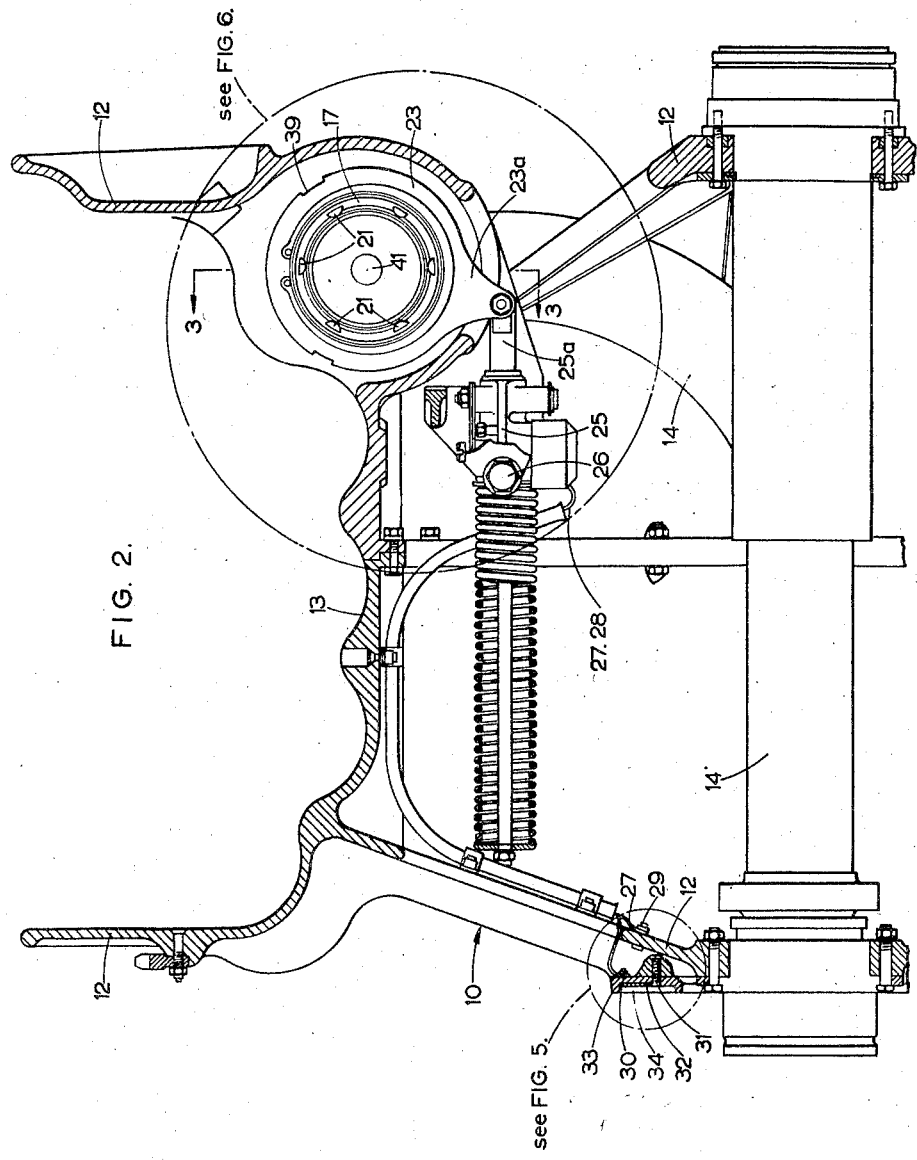

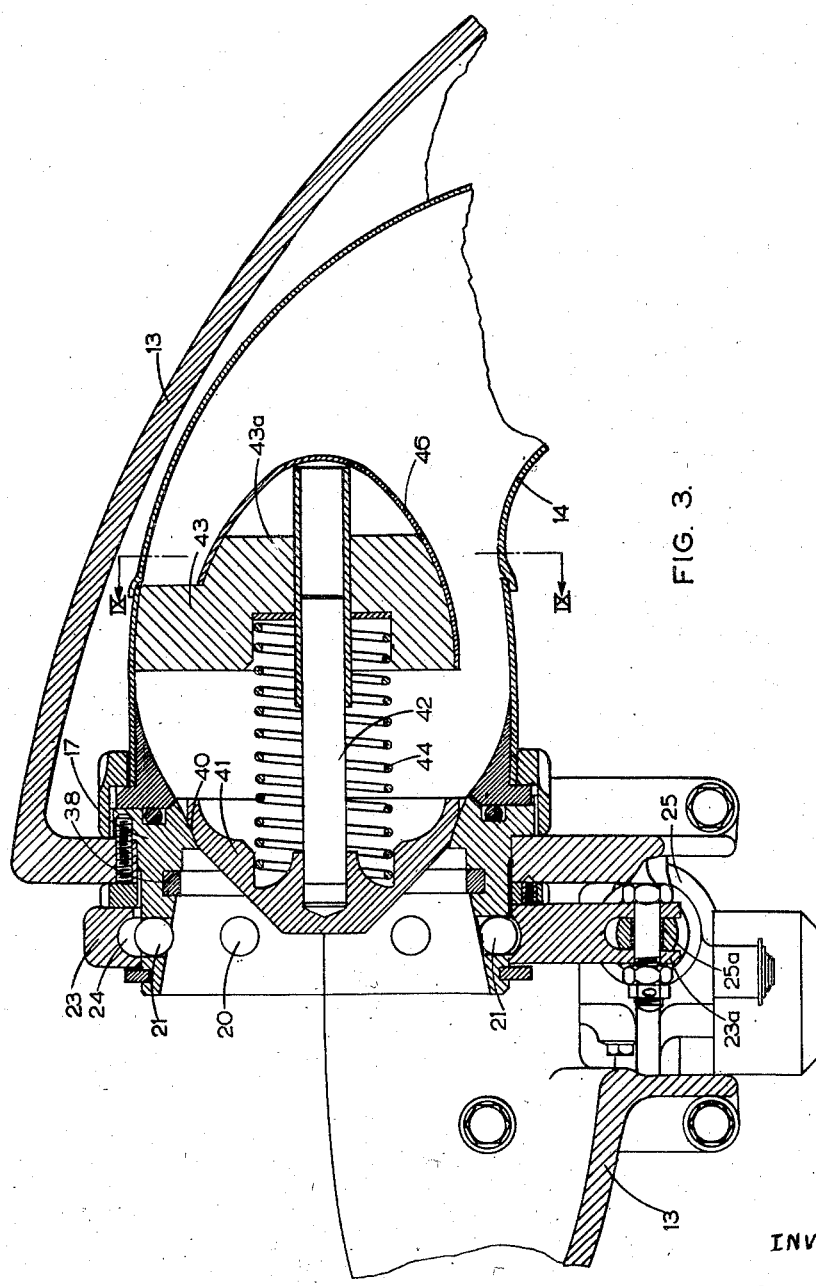

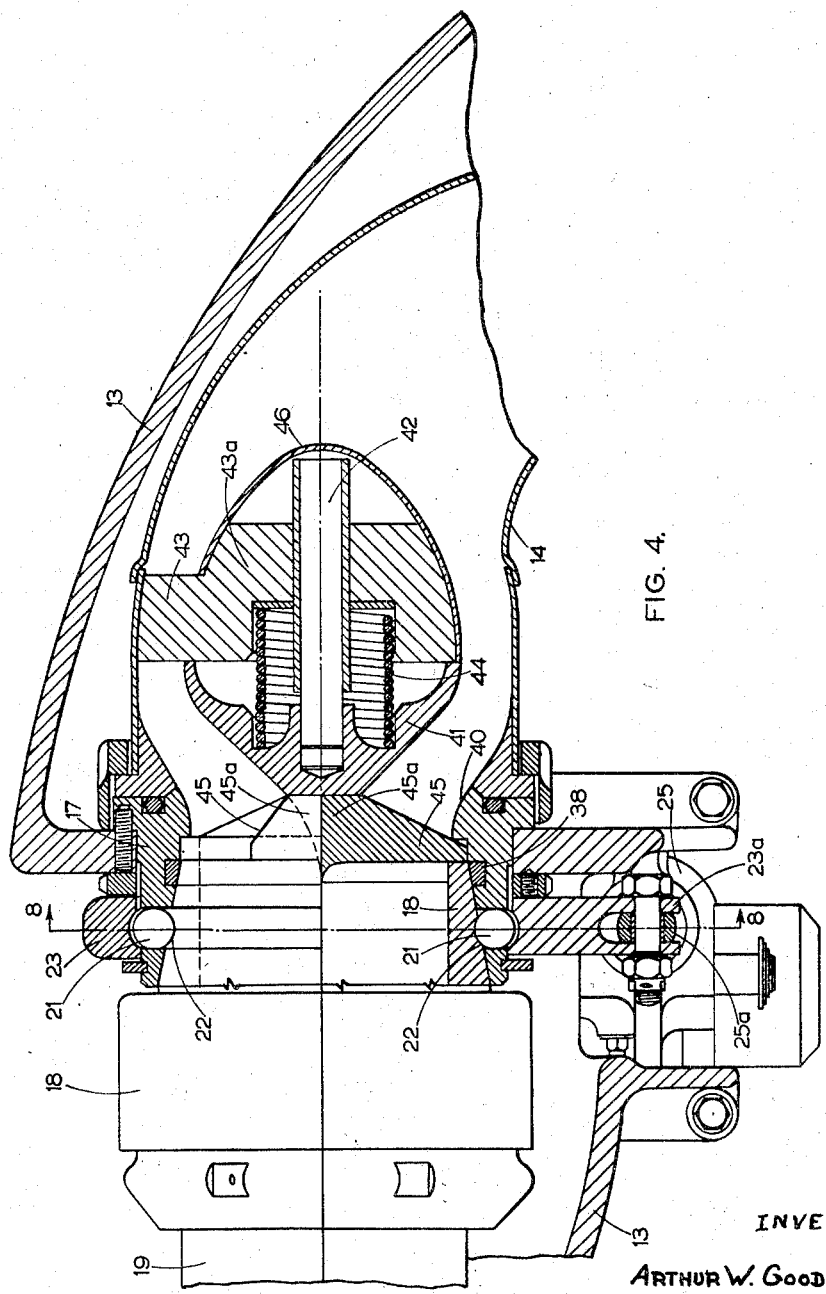

April 9, 1957  A. W. GOODLIFFE ET AL  2,788,243
HOSE-REELS WITH MEANS FOR JETTISONING THE HOSE
AND SEALING THE HOSE CONNECTION
Filed Jan. 20, 1956  6 Sheets-Sheet 5

INVENTORS
ARTHUR W. GOODLIFFE
PETER S. MACGREGOR

By Watson, Cole, Grindle
& Watson  ATTORNEYS

April 9, 1957  A. W. GOODLIFFE ET AL  2,788,243
HOSE-REELS WITH MEANS FOR JETTISONING THE HOSE
AND SEALING THE HOSE CONNECTION
Filed Jan. 20, 1956  6 Sheets-Sheet 6

INVENTORS
ARTHUR W. GOODLIFFE
PETER S. MACGREGOR

By Watson, Cole, Grindle
& Watson ATTORNEYS

United States Patent Office 2,788,243
Patented Apr. 9, 1957

2,788,243

HOSE-REELS WITH MEANS FOR JETTISONING THE HOSE AND SEALING THE HOSE CONNECTION

Arthur W. Goodliffe, Wimborne, and Peter S. Macgregor, Upton, Poole, England, assignors to Flight Refueling Incorporated, Danbury, Conn., a corporation of Delaware Application January 20, 1956, Serial No. 560,463

Claims priority, application Great Britain February 4, 1955

9 Claims. (Cl. 299—79)

This invention relates to hose-carrying reels and more particularly to reels which, in accordance with conventional practice, have a conduit inside the reel drum terminating at one end in a rotary gland for connection to a fixed external pipe and at the other end in a coupling device for connection to the hose. The invention is primarily applicable to the hose-reels of airborne installations for flight-refuelling, in which the hose is payed out by the reel and streamed aft for connection by means of a self-engaging coupling device to a pipe extending from another aircraft.

In the operation of such installations emergencies may occur necessitating jettisoning of the hose when fully trailed, and when this occurs the conduit in the reel must be sealed off at once in order to avoid a violent discharge of inflammable liquid.

An object of this invention is to provide improved means for jettisoning the hose and concurrently sealing off the conduit; and in addition to its primary application to flight-refuelling installations the invention may find useful applications to hose-reels used for other purposes.

How the foregoing object, and such other objects as may hereinafter appear, are achieved by this invention, and the nature of the invention generally, will be more fully understood from the following description, having reference to the accompanying drawings, of a typical embodiment of the invention, given by way of example only and without implied limitation of the scope of the invention, which is defined in the hereto appended claims. In the drawings, Figure 1 is a perspective view of the reel and its mounting, partly broken away;

Figure 2 is a half axial section of the reel;

Figure 3 is a fragmentary section on the line 3—3 of Figure 2, on an enlarged scale;

Figure 4 is a view similar to Figure 3, showing the hose locked to the reel;

Figure 1:
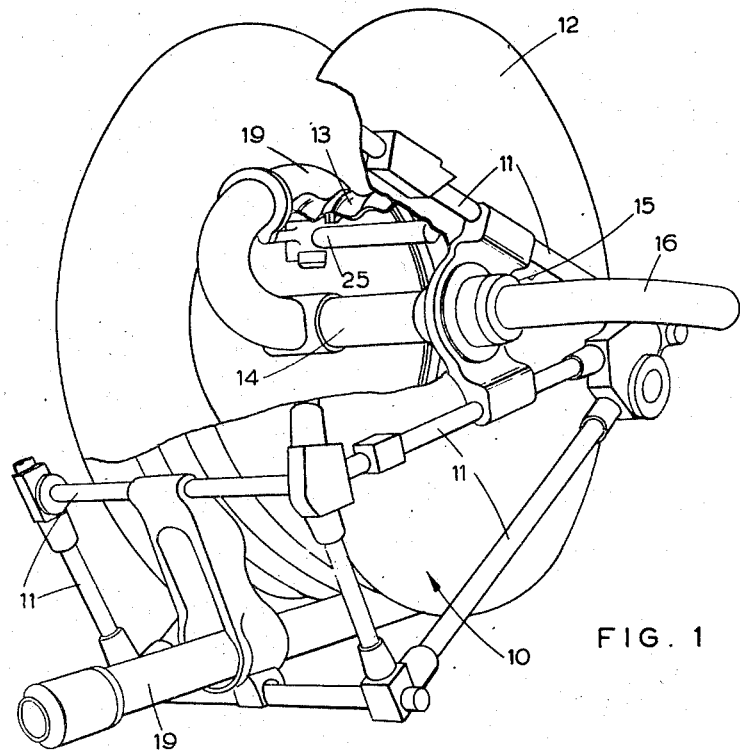

Referring to the drawings, the reel 10 is mounted in bearings carried by a framework 11, and comprises side flanges 12 and a hose-carrying drum 13 cast in one piece. Within the drum 13 is a conduit constituted by a rigid, sinuous pipe 14, one end of which is connected, through a rotary gland 15 coaxial with the reel, with an external fixed pipe 16 (Figure 1).

The other end of pipe 14 terminates in a socket 17 fixed to the reel casting and internally tapered to receive the tapered end of a plug-like adaptor 18 secured to the end of a hose 19, which is wound on the drum 13 (Figure 4).

In the socket 17 are a number of radial openings 20 in which balls 21 are loosely located; the inner margins of the openings 20 being slightly constricted to retain the balls from escaping inwards. When the adaptor 18 is inserted fully into the socket (Figure 4) an annular groove 22 in its tapered portion registers with the balls 21. The latter are further retained by an external locking ring 23 which is mounted on the socket 17 for rotation about the axis of the socket and has internal ball-receiving recesses 24 (Figure 8).

The locking ring 23 has an ear 23a to which is pivotally connected a plunger 25a slidably mounted in a body 25 which is pivotally supported at 26 within the drum 13, the plunger being substantially parallel to the axis of the reel.

Figure 8:
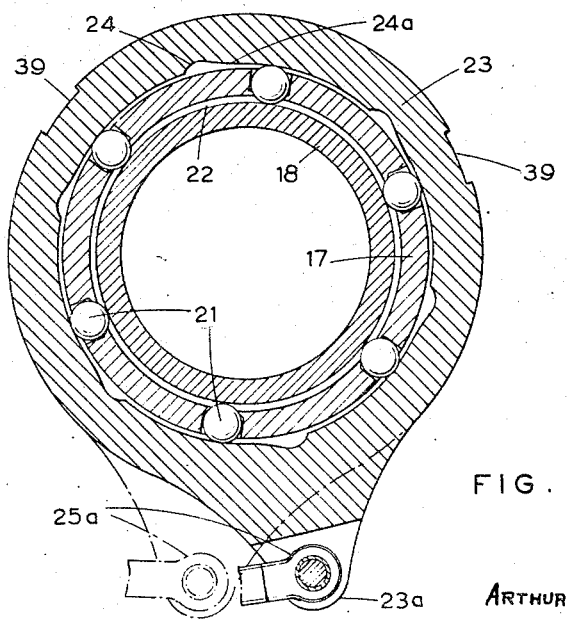
Figure 8 is a section on the line 8—8 of Figure 4.
Figure 6:
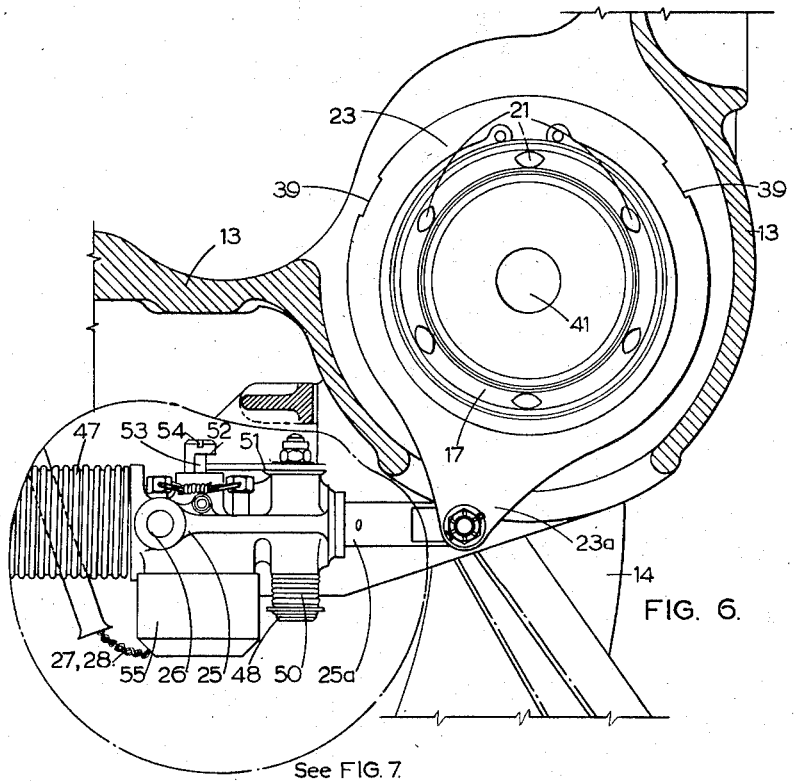
Figures 5 and 6 are fragmentary views showing the ringed portions of Figure 2 on an enlarged scale.

The plunger 25a is loaded by a spring 47 so as to take up the position shown in Figure 2 and in chain-dotted lines in Figure 8. In this position the recesses 24 of the locking ring 23 are in register with the balls 21 so that the locking ring allows the balls to recede into the openings 20. When the locking ring is located into the position illustrated in full lines in Figure 8, thus compressing the spring 47, the inclined portions or ramps 24a of the recesses 24 press the ball 21 radially inwards, causing them to engage the groove 22 of the adaptor 18, when fully inserted in the socket 17, and lock the adaptor in position (Figures 4 and 8). The joint between the adaptor and socket is rendered fluid-tight by a sealing ring 38 lodged in an annular groove of the socket.

The plunger 25a can be locked in the full-line position of Figure 8 by means of a spring-loaded, electromagnetically releasable, locking device.

Figure 5:
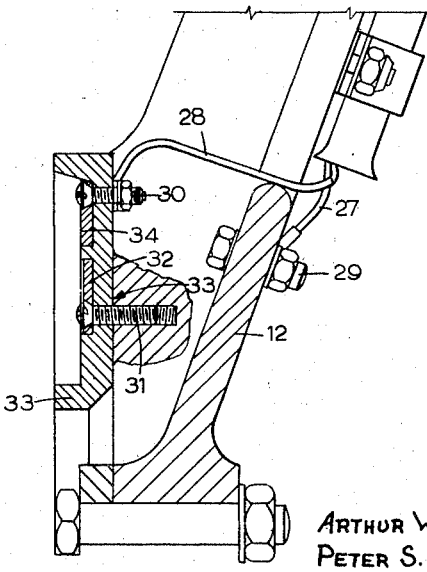
Figure 7:
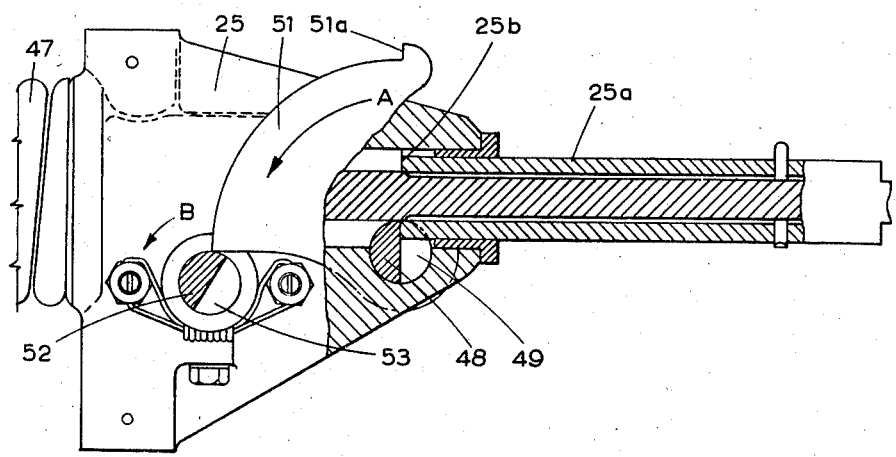
Figure 7 is a fragmentary plan, partly sectioned, on an enlarged scale, of the ringed portion of Figure 6.
Figure 9:
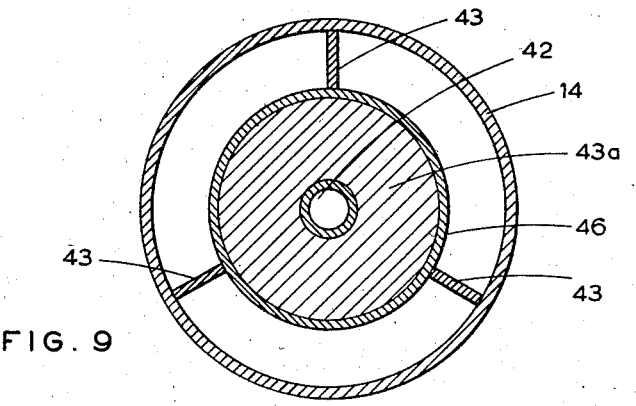
Figure 9 is a section on the line 9—9 of Figure 3.
Figure 10:
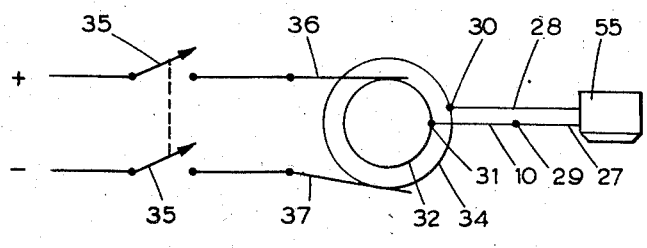
Figure 10 is a circuit diagram.

The latter comprises a locking member constituted by a spindle 48 having a flat 49 engageable with a shoulder 25b of the plunger 25a to retain the latter in the full-line position of Figure 8 against the effort of spring 47 (see Figure 7). Spindle 48, which is loaded by a spring 50 tending to rotate it in the sense contrary to arrow A (Figure 7) can be retained in the plunger-locking position by a locking member-retaining element constituted by a spindle 52, which engages a quadrant 51 mounted on spindle 48, as shown in Figure 7. Spindle 52 has a slot 53, which, when the spindle 52 is rotated against the effort of a spring (not illustrated) through a small angle in the sense of arrow B from the position shown in Figure 7, allows the quadrant 51 to pass through it, thus releasing the spindle 48 for rotation by the effort of spring 47, transmitted by shoulder 25b to flat 49 and against the effort of spring 50 in the sense of arrow A to release the plunger 25a. This rotation of the quadrant is limited by engagement of a spur 51a on the quadrant with the spindle 52. The spindle 52 has a saw-cut 54 enabling it to be rotated into the quadrant-locking position of Figure 7 by means of a screw-driver. From this position the spindle 52 is rotatable in the sense of arrow B by an electromagnet enclosed in a housing 55 and electrically connected by conductors 27, 28 with terminals 29, 30. Terminal 29 is earthed to the body of the reel, which is electrically connected by a screw 31 with a slip ring 32 mounted on an insulating ring 33 secured to one of the reel flanges 12, while terminal 30 is directly connected to another slip ring 34 mounted on the ring 33 (see Figure 5). Current is supplied to the slip rings from an external circuit containing a control switch 35 through brushes 36, 37 (Figure 10).

When the plunger 25a is released on closure of switch 35 it is retracted by its spring 47, and rotates the locking ring 23 through a small angle into the position shown in chain-dotted lines in Figure 8, in which the recesses 24 receive the balls 21 and thus release the adaptor and allow it to be pulled out of the socket 17 by the hose-tension.

If it is required to detach the hose from the reel for servicing or replacement the locking device 48 must be released either by closing the switch 35, or preferably by rotating the spindle 52 by means of a screw-driver into the releasing position.

When the hose is detached from the reel the plunger 25a and locking ring 23 will normally be in the position illustrated in chain-dotted lines in Figure 8, so that on reassembling the hose the adaptor 18 can be inserted into the socket 17 without difficulty. To secure the adaptor in the socket it is then necessary to bring the balls 21 into the locking position by rotating the locking ring 23 by hand into the full-line position of Figure 8 against the effort of the spring 47 of the plunger 25a. For this purpose the locking ring 23 is provided with recesses 39 for engagement by a suitable wrench.

The plunger 25a is thus brought into the position shown in Figure 7 and the quadrant 51 is rotated by spring 50 in the sense contrary to arrow A slightly beyond the position of Figure 7, allowing the spindle 52 to be returned by means of its own spring into the position of Figure 7. On releasing the locking ring 23 spring 47 brings the quadrant 51 against the spindle 52 which holds the quadrant 51 and plunger 25a in the locking position until the spindle 52 is positively rotated by the electromagnet enclosed in housing 55 in the sense of arrow B.

The interior of the socket 17 (Figures 3 and 4) is provided with a valve-seating 40 for a poppet valve 41, whose stem 42 is slidably supported in the boss 43a of a spider 43 mounted within the end of the pipe 14 next the socket. Boss 43a also affords an abutment for a spring 44 by which the valve 41 is held against its seating (Figure 3). In the mouth of the adaptor 18 is disposed a second spider 45, whose boss 45a protrudes from the mouth of the adaptor, and, when the latter is fully inserted in the socket, pushes the valve 41 off its seating (Figure 4). When the adaptor is released, the valve 41 is returned to its seating by the spring 44 and seals the pipe 14 as the adaptor leaves the socket.

The spider 43 also carries a fairing 46, and the boss 45a, valve 41 and fairing 46 are so shaped that when the valve is pressed off its seating by boss 45a it meets the fairing 46, the boss 45a, valve 41 and fairing then together constituting a body of streamline profile, which encloses the valve stem 42, the spider boss 43a and spring 44 and is centrally disposed in the mouth of pipe 14, being separated from the pipe wall by an annular gap constituting the fluid-passage.

We claim:

1. In combination with a hose and a fixed pipe, a reel comprising a hose-carrying drum and a fluid-conveying conduit, a rotary gland coaxial with the reel and connecting one end of said conduit to said fixed pipe, a socket on the other end of said conduit, a plug-like adaptor on one end of said hose, said adaptor having an external circumferential groove and said socket being adapted to receive said adaptor, means for locking said adaptor in said socket comprising locking members, such as balls, loosely retained and radially displaceable in radial openings of said socket to engage and disengage the annular groove of the adaptor, a locking ring mounted coaxially on said socket for partial rotation about the socket-axis between a locking position, in which it retains said locking members in engagement with said annular groove, and a releasing position, said locking ring having recesses which in the latter position of said ring register with and receive said locking members so as to allow them to disengage from said annular groove, an actuator for moving said locking ring from said locking position to said releasing position, and electrical means for remotely controlling said actuator; and means for sealing said conduit on release of said adaptor from said socket comprising a valve seating in the interior of said socket, a poppet valve seatable on said seating, spring means tending to seat said valve on its seating, and means supported in said adaptor centrally thereof and adapted to unseat said valve against the effort of said spring means when said adaptor is inserted into said socket.

2. The combination defined in claim 1, in which the locking-ring actuator is mounted inside the reel-drum and includes a first spring acting on the locking-ring to move it from the locking to the releasing position, a locking member movable between a position in which it retains the locking-ring in locking position and a position in which it releases the locking-ring for movement to releasing position, a second spring tending to move said locking member to the locking-ring-releasing position, a movable retaining element normally retaining said locking member in the locking-ring-retaining position, and an electromagnet adapted to move said retaining element from its normal position to allow said second spring to move said locking member to the locking-ring-releasing position and thus allow said first spring to move the locking ring to the releasing position, thus releasing the adaptor from the socket.

3. The combination defined in claim 2, in which the locking-ring actuator includes a body pivotally mounted on the reel drum, a plunger slidable in said body and disposed substantially parallel to the reel axis, said plunger being actuated by said first spring and being pivotally connected to said locking-ring, said locking member, second spring, retaining element and electromagnet being mounted on said body.

4. The combination defined in claim 1, in which said poppet valve has a stem, and which includes a spider rigidly mounted in said fluid-conveying conduit adjacent said socket and having a central boss constituting an abutment for the spring means which tend to seat the poppet valve, said valve stem being slidably supported by said boss, and a cup-like fairing supported on said boss and so shaped as to form, together with the poppet valve when fully unseated, a body of streamline profile separated from the wall of said fluid-conveying conduit by an annular gap.

5. The combination defined in claim 4, including a second spider rigidly mounted in the adaptor and having a central boss which constitutes the said valve-unseating means and is so shaped as to complete the streamline profile of the valve when in contact therewith.

6. In combination, a hose, a plug-like adaptor on an end of said hose, a reel, a fluid conduit fixed in said reel, an adaptor-receiving socket forming one termination of said conduit, a spring-loaded valve in said conduit, means mounted in said adaptor for unseating said valve against its spring-loading when said adaptor is fully inserted in said socket, means for locking said adaptor in said socket, a first spring adapted to move said locking means to adaptor-releasing position, a locking member adapted to retain said locking means in adaptor-locking position, a second spring adapted to move said locking member to a locking-means-releasing position, a retaining element adapted to retain said locking member in locking-means-retaining position, and electromagnetic means for moving said retaining element to a locking member-releasing position to enable said second spring to cause said locking member to release said locking means for movement to adaptor-releasing position by said first spring.

7. The combination defined in claim 6, in which said locking means includes a plunger acted on by said first spring, and said locking member comprises a shaft, which is rotatable through substantially 90° by said second spring and has a diametral flat engageable with a shoulder of said plunger when said first spring is tensioned, and a quadrant mounted on said shaft; and said retaining element is constituted by a shaft normally engaging one flank of said quadrant when said flat is engaged with said shoulder and said second spring is tensioned, said last-named shaft having a cut-away part enabling said quadrant to pass when said last-named shaft is rotated through a small angle, the said electromagnetic means being adapted to effect such rotation.

8. In combination with a hose and a fixed pipe, a reel comprising a hose-carrying drum and a fluid-conveying conduit, a rotary gland coaxial with the reel and connecting one end of said conduit to said fixed pipe, a socket on the other end of said conduit, a plug-like adaptor on one end of said hose, said adaptor having an external circumferential groove and said socket being adapted to receive said adaptor, means for locking said adaptor in said socket comprising locking members, such as balls, loosely retained and radially displaceable in radial openings of said socket to engage and disengage the annular groove of the adaptor, a locking ring mounted coaxially on said socket for partial rotation about the socket-axis between a locking position, in which it retains said locking members in engagement with said annular groove, and a releasing position, said locking ring having recesses which in the latter position of said ring register with and receive said locking members so as to allow them to disengage from said annular groove, an actuator for moving said locking ring from said locking position to said releasing position, and means operable at will for controlling said actuator; and means for sealing said conduit on release of said adaptor comprising a valve-seating in the interior of said conduit, a valve seatable on said seating, and means operatively connected with said valve and the socket-and-adaptor connection for effecting substantially simultaneous release of the adaptor and closing of the valve.

9. In combination, a hose, a plug-like adaptor on an end of said hose, a reel, a fluid conduit fixed in said reel, an adaptor-receiving socket forming one termination of said conduit, a valve in said conduit, means for locking said adaptor in said socket, a first spring adapted to move said locking means to adaptor-releasing position, a locking member adapted to retain said locking means in adaptor-locking position, a second spring adapted to move said locking member to a locking-means-releasing position, a retaining element adapted to retain said locking member in locking-means-retaining position, and means for moving said retaining element to a locking member-releasing position to enable said second spring to cause said locking member to release said locking means for movement to adaptor-releasing position by said first spring, and means operatively connecting said valve with said socket-and-adaptor connection to close said valve when the adaptor is released.

No references cited.